United States Patent Office 3,056,673

Patented Oct. 2, 1962

3,056,673

PRINT-OUT AND DEVELOPABLE-OUT PHOTOGRAPHIC PROCESSES

Eugene Wainer, Cleveland Heights, Ohio, assignor to Horizons Incorporated, Cleveland, Ohio, a corporation of New Jersey No Drawing. Filed Apr. 18, 1960, Ser. No. 22,703
7 Claims. (Cl. 96—48)

This invention relates to photography. More particularly it relates to compositions which are sensitive to light and which are suitable for photography and photographic reproduction purposes. The invention relates to the production of stable, colored, print-out, and developable out images produced by exposing to light and/or to light and heat, combinations of organic amines, specific organic halogen-containing compounds which produce free radicals on exposure to light, and various substrates for suitable disposition of the active agents with or without minor additions for specific and minor purposes and more specifically this invention relates to the control of spectral sensitivity in the production of such images. As the result of the ability to control these photochemical reactions as a function of the specific devices for imparting spectral sensitivity over relatively narrow ranges, a multiplicity of photochemical reactions of useful nature is available in one and the same composition as a function of the manipulation of the wave length of the incident light.

In various copending United States patent applications filed by me including Serial Nos. 787,112, filed January 16, 1959; 841,459, filed September 22, 1959; 841,460, filed September 22, 1959; 842,569, filed September 28, 1959; 1,161 and 1,162, both filed January 8, 1960, I have described the utility of photochemical reactions between certain organic amines and certain organic halogen compounds which act as sources of halogen free radicals on exposure to light. As described in the aforesaid applications, suitable organic halogen compounds are halogenated hydrocarbons in which the active halogen atom is attached to a carbon atom to which there is attached not more than a single hydrogen atom and as more specifically described in my application Serial No. 787,112, filed January 16, 1959, the activation energy of the halogen-containing free radical is the most important factor in determining the suitability of the halogenated hydrocarbon for the process. It appears that in order for the halogenated hydrocarbon to be effective, it must have an energy of dissociation or in other words, an energy of formation of the free halogen radical of not less than about 40 kilogram calories per mol.

I have now found that the spectral sensitivity of such photochemical reactions can be controlled by proper choice of organic halogen-containing compound which acts as a source of free radicals and that such control provides an expanded facility for use of these reactions and a degree of flexibility not available through random use of such organic halogen compounds.

Principal objects of this invention are: to provide a chemical means of control of spectral response of a photochemical reaction within the category described in my copending applications and hereinafter more fully described; to utilize the means of control of spectral response to facilitate the preparation of the photosensitive compositions with respect to the type of light that may be used during the preparation and prior to exposure; as a result of the means of control of spectral sensitivity to increase the effectiveness of the photochemical reaction by making fuller use of all the energy available from a specific light source; to make possible the development and utilization of more than one photochemical reaction in one and the same material through manipulation of spectral ranges of incident light; as a result of such manipulation of incident light to enable one and the same system to be either negative working or positive working as desired.

As has been explained in the aforesaid copending applications, certain organic halogen compounds appear to be effective sources of highly reactive free radicals on exposure to light of suitable wavelengths. When these free radicals are formed in the presence of certain arylamines or N-vinylamines or combinations thereof, highly useful color changes of permanent nature take place making such reactions of utility in the photographic art. On a practical basis, the majority of photographic exposures are limited by the specific nature of a light source and, generally speaking, the light source utilized is not normally the ideal one for a specific combination of ingredients.

I have found that by suitable choice of the organic halogen compound which represents the source of the free radicals, the desired photochemical reaction can be made to take place within a relatively narrow spectral range which, in many cases, can be matched with levels of high intensity from a specific light source to enable one to make best use of the energy available from such light source. I have further found that such reactions will not take place at wave lengths substantially longer than in the region of peak sensitivity and, more important, nor in wave lengths very much shorter than the region of peak sensitivity. As a result, by utilizing free radical sources which have individually different peak sensitivities (for decomposition to produce free radicals under the influence of light), reaction control is available for a number of useful end items by the use of such free radical sources in conjunction with light of widely different spectral sensitivity ranges.

The nature of the organic halogenating compound determines, in the main, the area of peak sensitivity and the spectral range of sensitivity. In general, it appears that the higher the bond dissociation energy for free radical formation, the shorter the wave length at which the free radical source exhibits peak sensitivity.

The organic halogen-containing compounds suitable for the purposes of my invention may be divided into three groups. The first group of free radical sources exhibits peak sensitivity in the spectral range 5100 to 5500 A. and includes carbon tetraiodide, tribromoiodomethane, trichloroiodomethane, dichloroiodomethane, and dibromoiodomethane. Each of these, it will be noted, is a halogenated methane in which at least one hydrogen has been replaced by iodine, and at least two of the remaining hydrogens have been replaced by a halogen selected from the group consisting of iodine, bromine and chlorine. Of this group, the compound carbon tetraiodide is preferred since it is a solid at room temperature and is readily prepared in pure state. The liquids are also effective materials but present difficulties in utilization at room temperature because of their liquid state. This defect can be eliminated through encapsulation techniques by which means liquids may be incorporated in a solid film and retained indefinitely therein without evaporation.

The second group of free radical sources exhibits peak sensitivity in the spectral range 3900 to 4000 A. and includes carbon tetrabromide, trichlorobromomethane, and dichlorobromomethane. Each of these, it will be noted, is a halogenated methane in which at least one hydrogen has been replaced by a bromine atom and at least two of the remaining hydrogens have been replaced by a halogen from the group consisting of Cl and Br. Again, for reasons given in the previous paragraph, the compound carbon tetrabromide is preferred.

The third group of free radical sources useful for the purposes of my invention exhibit peak sensitivity in the region of 3000 A. and includes carbon tetrachloride, hexachloroethane, and tetrachlorotetrahydronaphthalene. Each of these, it will be noted, is a chlorinated hydrocarbon in which any carbon atom to which a chlorine is attached, is attached to not more than one hydrogen. For practical purposes hexachloroethane and tetrachlorotetrahydronaphthalene are preferred since they are stable solids at room temperature.

Three main groups of organic amines useful for the purposes of my invention have been described in my copending applications. The first group consists of amines wherein the amine nitrogen is attached to aryl or modified aryl substituents or, more specifically, carbocyclic, e.g. benzene or modified benzene ring substituents. Diphenylamine is representative of this group. The second group comprises amines in which the amine nitrogen constitutes a portion of a heterocyclic ring. Indoles, pyrroles and carbazoles are representative of the group. The third group of compounds represents an especially preferred species of the preceding groups and is comprised of N-vinylamines, and particularly amines in which the amine nitrogen is attached to a vinyl group and is also a member of a six-membered ring or a member of other ring structures having a number of members other than six. A typical preferred representative of this third class is N-vinylcarbazole. The amines listed above are merely indicative of the classes of amines which are active and are not intended to be taken as exhaustive but are merely exemplary.

The combination of halogen-containing organic compounds and organic amines is preferably disposed in a suitable base in which the two active constituents are dispersed. In general, suitable bases comprise synthetic resins, particularly non-oxygen containing polymers of vinylidene monomers, hydrocarbon waxes and mixtures thereof. Hydrocarbons which are suitable as the base or carrier in which the amine and free radical source are disposed are preferably the saturated straight chain or branched chain paraffin or isoparaffin hydrocarbons having the general formula $C_nH_{2n+2}$ wherein $n$ ranges from about 10 up to about 70. These hydrocarbons are generally designated as paraffin waxes, microcrystalline waxes, petrolatum, or by similar class names. Blends of waxes with one another, or with synthetic resin polymers may be used as well as single compounds. The use of such bases not only facilitates the proper disposition of the ingredients in the compositions but permits the utilization of such photosensitive compositions on desired supporting substrates such as paper, glass, cloth, synthetic resin sheeting, metallic surfaces, and the like, e.g. by conventional coating techniques.

Typical photosensitive compositions are given in Table 1.

TABLE 1

*Typical Photosensitive Compositions*

SERIES I.—DIPHENYLAMINE

| I(a) | I(b) | I(c) |
|---|---|---|
| 160 cc. acetone<br>16 g. nitrocellulose.<br>5 g. dioctylphthalate.<br>24 g. diphenylamine.<br>83 g. carbon tetraiodide. | 160 cc. acetone.<br>16 g. nitrocellulose.<br>5 g. dioctylphthalate.<br>24 g. diphenylamine.<br>56 g. carbon tetrabromide. | 160 cc. acetone.<br>16 g. nitrocellulose.<br>5 g. dioctylphthalate.<br>24 g. diphenylamine.<br>40 g. hexachloroethane. |

SERIES II.—INDOLE

| II(a) | II(b) | II(c) |
|---|---|---|
| 200 cc. benzene.<br>20 g. polystyrene.<br>8 g. tricresylphosphate.<br>30 g. indole.<br>83 g. carbon tetraiodide. | 200 cc. benzene.<br>20 g. polystyrene.<br>8 g. tricresylphosphate.<br>30 g. indole.<br>56 g. carbon tetrabromide. | 200 cc. benzene.<br>20 g. polystyrene.<br>8 g. tricresylphosphate.<br>30 g. indole.<br>40 g. hexachloroethane. |

SERIES III.—N-VINYLCARBAZOLE

| III(a) | III(b) | III(c) |
|---|---|---|
| 150 cc. benzene.<br>15 g. eicosane (M.P.=38° C).<br>5 g. hexahexacontane (M.P.=103° C).<br>20 g. N-vinylcarbazole.<br>25 g. carbon tetraiodide. | 150 cc. benzene.<br>15 g. eicosane (M.P.=38° C).<br>5 g. hexahexacontane (M.P.=103° C).<br>20 g. N-vinylcarbazole.<br>16 g. carbon tetrabromide. | 150 cc. benzene.<br>15 g. eicosane (M.P.=38° C).<br>5 g. hexahexacontane (M.P.=103° C).<br>20 g. N-vinylcarbazole.<br>12 g. hexachloroethane. |

SERIES IV.—N-VINYLCARBAZOLE

| IV(a) | IV(b) | IV(c) |
|---|---|---|
| 150 cc. benzene.<br>15 g. eicosane<br>5 g. hexacontane.<br>0.2 g. azo-bis-isobutyronitrile.<br>20 g. N-vinylcarbazole.<br>25 g. carbon tetraiodide. | 150 cc. benzene.<br>15 g. eicosane.<br>5 g. hexacontane.<br>0.2 g. azo-bis-isobutyronitrile.<br>20 g. N-vinylcarbazole.<br>16 g. carbon tetrabromide. | 150 cc. benzene.<br>15 g. eicosane.<br>5 g. hexacontane.<br>0.2 g. azo-bis-isobutyronitrile.<br>20 g. N-vinylcarbazole.<br>12 g. hexachloroethane. |

These compositions are preferably prepared as solutions under darkroom conditions utilizing a red safelight. In making up the compositions, the reagents are added to the solvent listed in the order given and are completely dissolved before the next reagent is added. Such compositions may be stored indefinitely in liquid state in a stoppered brown bottle which has been wrapped with aluminum foil to insure absence of actinic light. In applying such compositions to a carrying surface such as glass, these are spread on the surface of such glass, e.g. with a doctor knife, so as to yield a dried thickness of three to four mils. Usually a wet thickness of ten to twenty mils is required, depending on the specific composition to yield the desired dry thickness. Such film spreading is carried out under a red safelight and the films allowed to dry under a red safelight until all solvent has disappeared.

In obtaining the results reported in this specification, I have used three types of light sources. The first type was a 275 watt input General Electric reflector type sunlamp with a glass envelope. The watts radiated from such a lamp as a function of wavelength are given in Table 2. This lamp was utilized at a distance of 10 inches. The second lamp used was a frosted bulb 40 watt tungsten filament lamp of the type normally used in the household. This lamp was used at a distance of 10 feet from the photochemical surfaces.

TABLE 2

*Light Output*

(G.E. RS SUNLAMP 275 WATT)

| Wave length (A.): | Radiated watts |
|---|---|
| 2652 | 0.004 |
| 2850 | 0.05 |
| 2967 | 0.13 |
| 3022 | 0.34 |
| 3131 | 0.88 |
| 3250 | 0.07 |
| 3341 | 0.16 |
| 3500 | 0.14 |
| 3654 | 2.51 |
| 3750 | 0.09 |
| 3900 | 0.14 |
| 4047 | 0.72 |
| 4200 | 0.09 |
| 4358 | 1.48 |
| 4916 | 0.30 |
| 5461 | 1.73 |
| 5500–7600 | 3.20 |

The third lamp was a mercury activated gas discharge tube lamp with a quartz envelope with an input of 15 watts which radiates approximately three watts at 2536 A. and less than one watt at wave lengths higher than this spectral line.

All the compositions in Table 1 were exposed to the 40 watt Mazda lamp at a distance of 10 feet for a period of 45 minutes. Compositions (*a*) of each series fogged heavily under such exposure conditions; composition (*b*) in each series showed slight but distinctly noticeable fog, this being more pronounced in Series III and IV than in Series I and II. No fog whatsoever was found in composition (*c*) in each series. Thus, composition (*c*) utilizing the chlorine free radical source may be handled in dim Mazda light with impunity, thus greatly facilitating its utility, but iodine and bromine substituent types must be omitted.

All of the compositions given in Table 1 were exposed for one hour to the 40 watt frosted lamp at a distance of 10 feet with a No. 61 Wratten filter (green transmitting) placed in front of the light. Under these conditions, composition (*b*) and (*c*) in each of the series exhibited no fog whatsoever, whereas again compositions (*a*) still showed a substantial degree of fog. Thus, by use of a green filter, eliminating all wave lengths shorter than represented by the Wratten filter, compositions (*b*) and (*c*) can be handled safely whereas for best results compositions (*a*) apparently must be handled in dim redlight or better still in total darkness.

Films of uniform thickness of each of compositions (*a*), (*b*), and (*c*) of Series I based on diphenylamine were spread on glass plates under a deep red safelight and allowed to dry in the dark. Samples of each were then exposed to the light source given in Table 2 for varying lengths of time until the same approximate depth of color or color density was achieved with each of the three compositions as determined by visual examination. In the case of composition I(*a*), an exposure time of 15 seconds was required to produce a fully developed out image, apparently equal to an absorption of the order of 75 to 80% with respect to color. In the case of composition I(*b*), the same density of image was achieved in about 10 seconds; and in the case of composition I(*c*), 35 seconds were required to achieve the same density of image.

The same general relative ratio of photographic speed as based on times of exposure in comparing compositions (*a*), (*b*), and (*c*) was further identified in each of the other series given in Table 1.

The diphenylamine and indole compositions in Table 1 are direct print-outs. On exposure to an RS General Electric 275 watt sunlamp at a distance of 10 inches, the desired colors will print out directly on exposure in periods of 5 to 60 seconds depending on the depth of color desired. The diphenylamine compositions with carbon tetraiodide yielded greens or blue-greens on relatively short exposures, these turning blackish green or blackish blue on more lengthy exposures, whereas the compositions I(*b*) and I(*c*) containing bromine or chlorine yielded deep blues, these growing blue black on relatively lengthy exposures.

Using the same type of lamp system as indicated in the previous paragraph with the indole compositions of Table 1, the colors obtained on print-out are predominantly red. Depending on length of exposure, this red may be a pinkish red, a yellowish red, or a brownish red.

The N-vinylcarbazole compositions of Table 1 are latent image, high speed, photographically speaking, compositions. In this case, a latent image is produced by a very brief exposure to light followed by heating in the region of 90 to 110° C. for a few seconds, after which an image develops out. Depending on conditions, the color of the developed out image is generally gray-black, brown-black, or black, but sometimes greenish or bluish colors are experienced.

The spectral sensitivity of each of the compositions given in Table 1 was determined on a collimated light calibrated monochromator, the calibration being carried out through the use of a thermopile. Utilizing wave length bands of incident light, generally of the order of 200 and 500 A., the number of quanta per square centimeter just sufficient to yield a fairly detectable image was determined. The significant result obtained was not only the fact that the sensitivity curves indicate that peak sensitivity is achieved at a particular wave length, but that sensitivity is greatly minimized or wholly lost relatively short distances both above and below such a wave length. More significantly, was the finding that variation in the nature of the amine had relatively little effect on either peak sensitivity or the range of spectral sensitivity with respect to wave length and that variations in peak sensitivity and spectral range are wholly a function of the choice of the source of free radicals, namely, the halogen-containing organic compound. With $CI_4$ peak sensitivity was experienced at about 5200 A.; with $CBr_4$ this occurred at about 3900 A.; and with $C_2Cl_6$ at about 3000 A.

In general, it was found that the time required to obtain a barely detectable image at the lower and upper limits of useful wave lengths was at least an order of magnitude greater than the time required to achieve a similarly barely detectable image at the wave length of peak sensitivity. In other words, the times at the outer limits of the range appear to be at least 10 and in as many cases as great as 100 times longer than the time required to achieve a similarly dense image at the peak wavelength.

EXAMPLE 1

(*a*) Composition I (*a*) of Table 1 was prepared except that the 83 grams of carbon tetraiodide were replaced with a mixture of 29 grams of carbon tetraiodide, 28 grams of carbon tetrabromide, and 6 grams of hexachloroethane. This composition was laid down quickly on glass under a deep red safelight and dried at room temperature in the dark, after which it was exposed for varying periods of time to light from a 275 watt reflector type sunlamp (Table 2) at a distance of 10 inches without the use of a filter. Color densities comparable to those achieved with the original compositions of Table 1 were obtained in exposure times of 4 to 5 seconds or roughly twice as fast as the fastest exposure when only one of the sources of free radicals was used. This increase in speed establishes that a better utilization of available light is available through the use of mixtures of sources of free radicals rather than through such free radicals singly, and represents a significant advance in the art.

(*b*) The same diphenylamine-carbon tetraiodide composition was used except that the 83 grams of carbon tetraiodide were replaced with 28 grams of carbon tetraiodide, 19 grams of carbon tetrabromide, and 13 grams of hexachloroethane. Again, the composition was prepared quickly under a deep red safelight and dried in the dark. Comparative exposures as carried out before showed that the density utilized for comparison purposes as above, namely, of the order of light absorption of about 75%, was achieved in exposure times of 5 to 6 seconds. This again is significantly faster than when any of the free radical sources are used separately.

EXAMPLE 2

The characteristics of Series II, Table 1 were traversed in the same manner as for Series I, Table 1, and the same general results obtained. In this case, however, approximately twice the exposure time utilized in Series I was required to yield transmission opacities visually estimated to be in the region of 0.7 to 0.75, the colors being red. For example, composition II (*a*) required a 30 second exposure; composition II (*b*) required a 20 second exposure; and composition II (*c*) required a 70 second exposure.

On substituting a mixture of 29 grams of carbon tetraiodide, 28 grams of carbon tetrabromide, and 6 grams of hexachloroethane in place of the 83 grams of carbon tetraiodide composition II (*a*), and preparing as before, an exposure time of 7 to 9 seconds was required to produce the deep red color of density comparable to that developed with exposure times given in the paragraph just recited.

N-vinylamine compositions roughly equivalent to those exemplified in Series III have been described in copending applications. These are latent image-high speed compositions which are developed out as the result of heating after exposure to light. Photographically speaking, these are very much faster than the simpler arylamine compositions typical of Series I and II, this increase in speed ranging from one to several orders of magnitude. Also described in my copending applications was the facility for making this composition positive working or negative working, by first making an exposure through a negative to the far ultraviolet followed by blanket exposure to light of longer wave length. I have now found that the reaction which takes place in using such a composition as a positive working device can operate as a scavenging device decreasing the yield, speed, and efficiency of the negative working reaction, and I have further found that if proper attention to the exact wave lengths of light is used in handling the composition as a positive working device that radical improvements in speed may be obtained. I have also found that if the scavenging reaction in the negative working example is eliminated, again further radical improvements in photographic speed are obtained.

On this basis, unusual flexibility of treatment leading to manifold areas of utility in one and the same photosensitive composition is possible. I have found this to be due to the fact that a combination of the N-vinylamines and the free radical source comprising an organic halogen-containing compound can undergo two separate and distinct photochemical reactions, depending on the wave length of the light used. N-vinylcarbazole can be caused to undergo polymerization in a solvent when exposed to light of short wave lengths. The speed of polymerization is slow but distinctly noticeable and generally results in the formation of a thick tar or insolubility in the solvent being utilized. This polymerization is very rapid at wave lengths as short as 2500 A. and has practically disappeared at 3600 A. I have further found that a fully polymerized N-vinylcarbazole mixed with the organic halogenating agents will not produce a noticeable color reaction even after long exposure to actinic light whether subsequently heated or not. In the presence of a free radical source involving an organic halogen-containing compound, it appears that not only does photopolymerization take place but at the same time the chemical nature of the polymer being formed is such that lengthy exposures will produce a color, and very brief exposures will enhance color development as a result of thermal development. I have further found that other free radical sources will enhance the photopolymerization of N-vinylcarbazole without the formation of color and again the formation of such a photopolymer is a function of the peak sensitivity of the free radical source in question. Thus, the exposure of a combination of N-vinylcarbazole and azo-bis-isobutyronitrile in polystyrene, for example, to an appropriate light source will cause a rapid polymerization yielding a white opaque substance which is a very effective light scatterer so that on transmission of light, the white opaque portions appear black on projection and the clear portions remain white. These experimental pieces of evidence represent the basis for the further delineation of my invention in the examples to follow.

EXAMPLE 3

In this example, the light source in accordance with Table 2 was utilized and a Corning glass filter No. 5–58 exhibiting a transmission of 35% at 4000 A., the range of transmission being 3600 to 4600 A., the transmission being substantially zero at these limits, was utilized as a filter for picking a specific range of wave lengths. To check the amount of light available using such a filter as against the use of no filter with the light source described in Table 2, composition II(*b*) was exposed with and without the filter until comparable densities were achieved, and it was found that roughly six times the exposure was required in the case of the use of the filter than in its absence. This is about as expected since the light source will radiate approximately 5 watts of energy in the range 3600 to 4600 A. as defined by the filter and the filter factor will reduce this radiation to approximately 0.82 watt.

A number of examples of the composition according to series III(*b*) were prepared. Some of these were exposed directly to the unfiltered radiation of the light source given in Table 2 for a period of 0.1 second. After heat development, a brown black image of density visually apparently equivalent to about an absorption of the order of 75% was obtained. The same plates were then exposed similarly through the Corning glass filter No. 5–58 and it was found that an exposure time of 0.05 to 0.06 second was required to achieve the same density. When the filter factor is applied to this exposure, this leads to the result that the photographic speed in radiation which prevents or minimizes the polymerization of the N-vinylcarbazole outside the range of effectiveness of the free radical source, carbon tetrabromide, is at least a factor of 10 greater through the prevention of this scavenging reaction. As indicated previously, a polymerization of N-vinylcarbazole without the influence of the photodecomposition of carbon tetrabromide is a scavenging reaction for the purposes of this invention, and would reduce, if it takes place, the yield, effectiveness, and speed of the photochemical reaction. In this example, sufficient radiation is available from the unfiltered light source outside the area of effectiveness of the carbon tetrabromide to cause a significant amount of scavenging reaction to take place.

EXAMPLE 4

The liquids in accordance with series III, compositions (*a*) and (*b*) were mixed in equal volumes and films laid down on glass plates as before under red light as quickly as possible and dried in the dark. These were exposed to the light source of Table 2 usng the Corning glass filter 0–51 which is opaque at 3600 A. and lower wave lengths and transmits through the visible. Its transmission at 4050 A. is about 65%. An exposure time of between 3 and 5 milliseconds was required to produce the same density as achieved in the earlier example, indicating that the combination of carbon tetraiodide and carbon tetrabromide was not only a more effective source of light produced free radicals than carbon tetrabromide alone to produce higher photographic speeds, but that the elimination of the premature photopolymerization of N-vinylcarbazole through the use of the filter also continued to produce the same advantages as described in the previous example.

EXAMPLE 5

Utilizing the light source given in Table 2, composition in accordance with series III(*a*) and series IV(*a*) were exposed for varying periods of time through a Corning glass filter 7–54. Such a filter transmits more than 40% of the incident light at 2540 A. 90% of the incident light at 3200 A., about 80% of the incident light at 3660 A., and is effectively opaque at 4000 A., and substantially through the visible. Subsequent to the exposure through the filter, the same specimen was re-exposed to the same light without the filter and then heated by treatment with infrared light to a temperature of 90 to 120° C. for a period of 30 seconds. The initial exposure time through the filter was varied in the case of both compositions until no color development was obtained as the result of the second exposure and heating.

In the case of the series III composition between 10 and 20 seconds exposure was required for this purpose, whereas in the case of the series IV composition, 1 and 2 seconds were sufficient to cause the photopolymerization of the N-vinylcarbazole to proceed to such an extent that it was no longer available for the color forming reaction in combination with carbon tetraiodide, thus establishing that the azo compound had facilitated the formation of the non-color forming polymer.

Utilizing the light source in Table 2 and the Corning glass filter No. 7–74 described in the previous paragraph, an exposure was made through a negative for a period of one second. Immediately thereafter, the negative and the filter was removed and the exposure continued for another second, after which the sample was treated with infrared light for 20 seconds so as to reach a temperature between 90 and 110° C. A brown black image developed out in the areas matching the black portions of the negative, whereas the transparent portions of the negative remained white, thus yielding a positive working process. The photographic speed available from this manipulation is apparently at least a factor of 10 greater than that described in copending application. By the use of a free radical source such as carbon tetraiodide whose decomposition is restricted at will by manipulation of the light sources and through use of a second photosensitive system in the same device with due regard for the areas of spectral sensitivity, increased photographic speeds are available in the positive working process. Thus, since the premature photopolymerization of N-vinylcarbazole is a scavenging and efficiency reducing kind of reaction, by the same token in the positive working process, the premature decomposition of the free radical source comprising the organic halogen combination would also be considered a scavenging and efficiency reducing reaction. The proper separation of these two reactions through the manipulation of the light sources produces a combination of high efficiency for positive working purposes.

To repeat, this is accomplished by the utilization of the use of organic halogen-containing compounds which act as free radical sources at spectral ranges not lower than 3600 A. and preferably significantly at higher ranges of wave length on into the visible. In this way, the two competing photoreactions can be separated at will.

EXAMPLE 6

The reversal of the procedure given in the previous example can be utilized for a fixing reaction as follows: A mixture of compositions (*a*) and (*b*), Series IV is first exposed to the light described in Table 2 through the Corning glass filter No. 0–51 for 0.1 second. It is then heat treated under the infrared lamp to produce the deeper brown black image. Then utilizing the Corning glass filter No. 7–54, the specimen is exposed to the light of the 15 watt quartz tube previously described for a period of one second. Any subsequent combination of ultraviolet, visible, and infrared does not have any effect on the character and quality of the image, and thus it may be considered permanently fixed. Again as before, this has been accomplished through the proper manipulation of the light sources so that the color forming reaction involving the sources of free radicals based on the organic halogen compounds is first obtained and the ability for such free radical sources to continue to be active is eliminated by the complete polymerization of the N-vinylcarbazole monomer remaining in the unexposed portions of the film. Obviously, if the procedure is reversed as accomplished in the previous example, fixing and development is simultaneous.

Finally, it should be noted that the photographic speed is enhanced through the addition of minor amounts of light absorbers which absorb light in the range of sensitivity of the source of the free radicals. For example, the composition (*c*) type utilizing the chlorine-containing organic compounds will exhibit an increase in speed in the presence of such ultraviolet absorbers as benzoin, stilbene, umbellifierone, benzophenone, and benzophenone derivatives. Combinations of these ultraviolet absorbers and yellow dyes soluble in the solvents indicated and in the synthetic resin substrate are expected to be effective for the class (*b*) type of organic halogen compounds representing sources of free radicals, whereas green and red dyes are expected to be effective for the class (*a*) type of halogen-containing halogen compounds acting sources of free radicals. Such enhancement of photographic speed through deliberate addition of light absorbers is well known in the art and not claimed here.

Having now described the invention in accordance with the patent statutes, I claim:

1. In a photographic process wherein a stable colored print-out image is produced by exposing an initially colorless photosensitive composition to light of a suitable wavelength and wherein the photosensitive composition comprises an arylamine selected from the group consisting of amines in which the amine nitrogen is attached to a carbon in a carbocyclic nucleus and amines in which the amine nitrogen is a member of a heterocyclic nucleus; and an organic halogen-containing compound which releases free radicals containing halogen on exposure to said light, selected from the group consisting of halogenated hydrocarbons having an energy of formation of a free halogen radical of not less than about 40 kilogram calories per mol and in which at least one active halogen selected from the group consisting of Cl, Br and I is attached to a carbon atom having not more than one hydrogen atom attached thereto, said composition being initially in the form of a thin film supported in a carrier selected from the group consisting of polymers of vinylidene monomers and straight chain and branched chain hydrocarbon paraffin and isoparaffin waxes, and mixtures thereof; the improvement which comprises: including in said photosensitive composition at least two organic halogen-containing compounds, said compounds being selected from the group consisting of compounds which release a free radical of a halogen selected from the group consisting of Cl, Br and I and further selected so that at least two different halogens are released from said organic halogen containing compounds as free radicals as a result of said exposure, whereby the time required for exposure sufficient to yield a useful image is substantially diminished as compared with the time required when the photosensitive compositions are otherwise similar except that they contain free radical sources which release not more than one of said halogens as a free radical.

2. The process of claim 1 wherein the organic halogen-containing compounds are selected from the group consisting of carbon tetraiodide, trichloroiodomethane, tribromoiodomethane, dichloroiodomethane, dibromoiodomethane, carbon tetrabromide, trichlorobromomethane, dichlorobromomethane, carbon tetrachloride, hexachloroethane, and tetrachloro-tetrahydronaphthalene and the light to which the compositions are exposed is from 4300 A. to 6100 A. when the free radical generated contains iodine, from 3000 A. to 4500 A. when the free radical generated contains bromine and from 2500 A. to 3500 A. when the free radical generated contains chlorine.

3. The process of claim 1 wherein the arylamine is an N-vinylarylamine and the development of a colored image is accomplished by exposure to heat following the exposure to light of said wave-lengths.

4. The process of claim 3 wherein the photosensitive composition is first exposed to a pattern of radiation confined to the far ultraviolet, and then given a blanket exposure to radiation of longer wave length.

5. The process of claim 3 wherein the photosensitive composition in addition to halogenated hydrocarbon consists essentially of N-vinylcarbazole and azo-bis-isobutyronitrile dispersed in polystyrene, whereby a white opaque solid product results from the exposure to said light.

6. The process of claim 3 wherein the radiation employed in the exposure step is controlled by suitable filters to pass only radiation within the stated range of wavelengths to thereby facilitate the production of halogen free radicals and to simultaneously therewith inhibit polymerization of the N-vinylamine in the composition by preventing light of other wavelengths from impinging on said composition.

7. The process of claim 4 wherein the blanket exposure consists of an exposure first to visible light of said wave lengths and then to infrared radiation.

References Cited in the file of this patent

UNITED STATES PATENTS

| | | |
|---|---|---|
| 1,574,357 | Beebe et al. | Feb. 23, 1926 |
| 1,587,272 | Beebe et al. | June 1, 1926 |
| 1,587,274 | Beebe et al. | June 1, 1926 |

OTHER REFERENCES

Zwikker: Fluorescent Lighting, Phillips Technical Library, Elsevier Press, Houston, Tex., 1952, pages 92–93.